United States Patent [19]

Parkinson

[11] Patent Number: 4,790,911

[45] Date of Patent: Dec. 13, 1988

[54] SOLVENT EVAPORATOR

[76] Inventor: Martin Parkinson, 6 N. Delaware Dr., Nyack, N.Y. 10960

[21] Appl. No.: 131,649

[22] Filed: Dec. 11, 1987

Related U.S. Application Data

[63] Continuation-in-part of Ser. No. 024,350, Mar. 10, 1987, abandoned.

[51] Int. Cl.⁴ .......................... B01D 1/22; B01D 3/08
[52] U.S. Cl. .................................. 202/205; 202/236; 202/238; 202/264; 202/267 R; 159/6.1; 159/7; 159/11.1; 159/11.2; 159/12; 159/DIG. 4; 159/DIG. 7; 159/DIG. 15; 203/86; 203/DIG. 2
[58] Field of Search .............. 159/11.2, 11.1, 9.1, 159/9.2, 7, 6.1, 12, 23, 49, DIG. 7, DIG. 4, DIG. 15; 202/238, 236, 205, 264, 267, 234; 203/20, 86, 89, 72, 91, DIG. 2

[56] References Cited

U.S. PATENT DOCUMENTS

| | | | |
|---|---|---|---|
| 1,501,515 | 7/1924 | Testrup | 159/12 |
| 2,291,421 | 7/1942 | Tannehill . | |
| 2,479,267 | 8/1949 | Sandford | 202/264 |
| 2,518,758 | 8/1950 | Cook | 203/99 |
| 2,695,868 | 11/1954 | Brücke | 202/264 |
| 2,735,807 | 2/1956 | Banker | 202/238 |
| 2,764,534 | 9/1956 | Nerheim | 159/DIG. 7 |
| 2,843,535 | 7/1958 | Zaugg | 202/238 |
| 2,865,445 | 12/1958 | Buchler | 159/11.2 |
| 3,190,817 | 6/1965 | Neugebauer et al. | 159/11.2 |
| 3,279,525 | 10/1966 | Takahashi | 159/7 |
| 3,306,829 | 2/1967 | Patterson et al. | 203/100 |
| 3,372,095 | 3/1968 | Nester | 159/DIG. 15 |
| 4,522,684 | 6/1985 | Saito | 159/11.2 |

Primary Examiner—Wilbur Bascomb
Attorney, Agent, or Firm—Martin Parkinson

[57] ABSTRACT

A rotary evaporator for laboratory scale solvent evaporative procedures is described. A magnetically driven fluorocarbon coated rotor, operating within a container for solvents, creates a thin film for rapid solvent evaporation without the usual requirement for rotating the entire solvent container assembly. Rotary seals are eliminated, increased control over bubbling and foaming at higher vacuum is obtained, and continuous solvent addition is simplified.

23 Claims, 4 Drawing Sheets

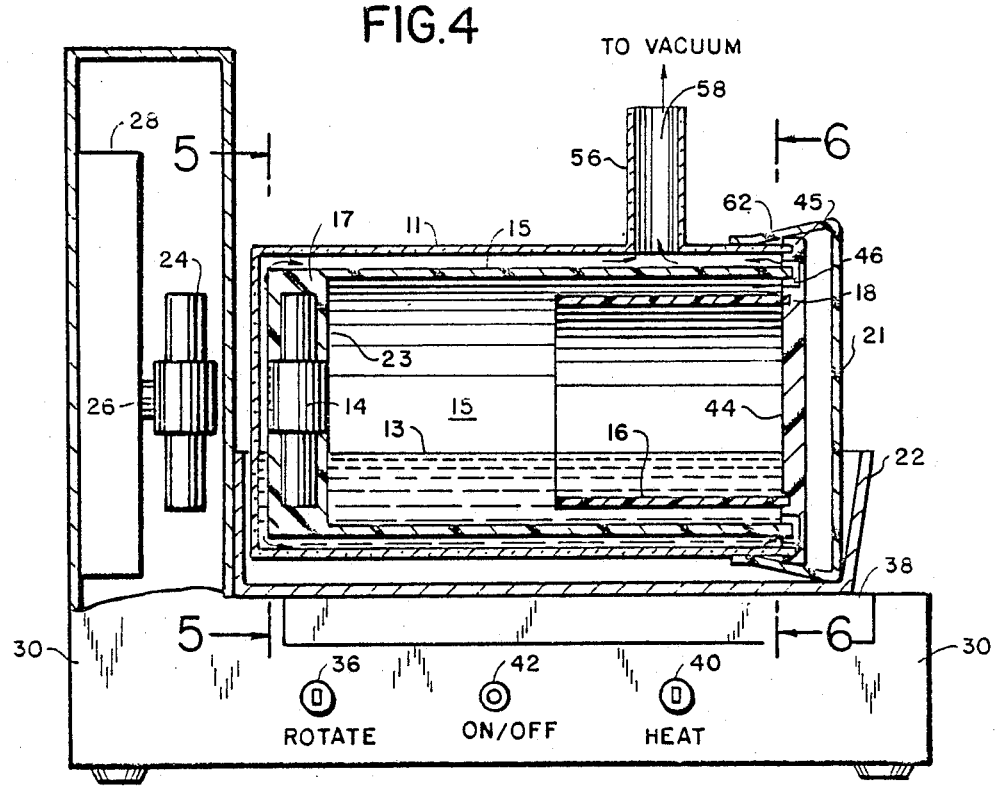
FIG.4
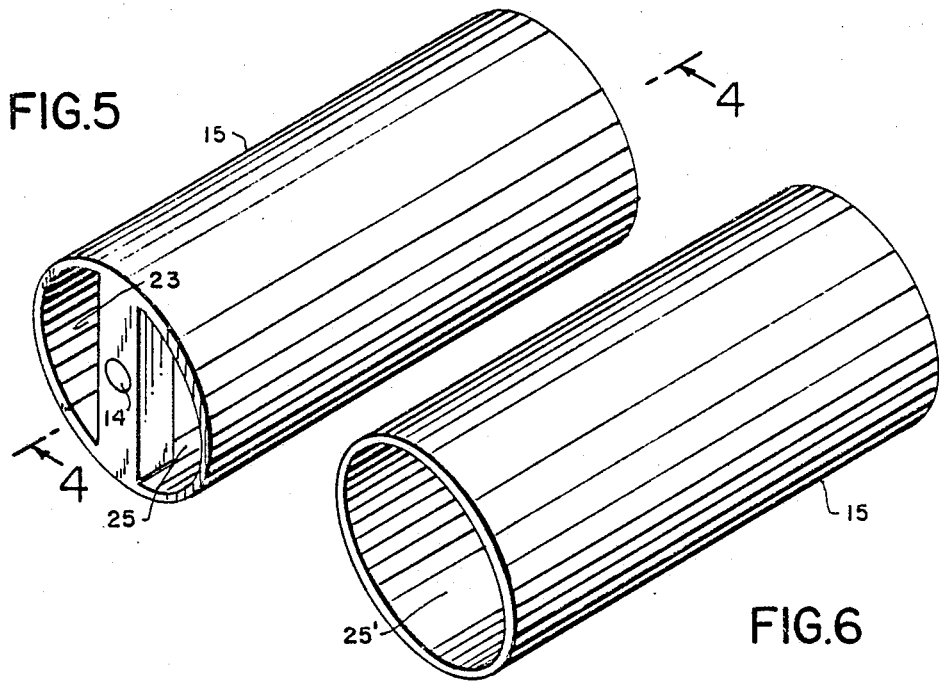
FIG.5
FIG.6

SOLVENT EVAPORATOR

BACKGROUND OF THE INVENTION

This application is a continuation in part of copending application Ser. No. 024,350, filed Mar. 10, 1987, now abandoned.

This invention relates to solvent evaporators, and more particularly to laboratory scale rotary evaporators.

In current laboratory practice, when it is required to concentrate or remove liquids such as water or organic solvents from a solution or suspension, the iiquid is usually placed in a round bottom flask. Means are then provided for rotating this flask in such a manner that a thin film of the solvent is spread over a relatively large area of the inside surface of the flask. A vacuum is applied to the contents of the flask, as, for example, by means of a water aspirator. Under these conditions of simultaneously subjecting the solvent contents of the flask to reduced pressure, centrifugal force, and the creation of a large area of thin film solvent deposition, evaporation proceeds at an accelerated rate. The foaming and bubbling of the solvent which often occurs in a vacuum distillation is either eliminated or substantially suppressed. Both batch and continuous process rotary evaporators of this type are described in U.S. Pat. No. 2,797,747 of July 2, 1957 and U.S. Pat. No. 2,865,445 of Dec. 23, 1958.

While the above mentioned devices have proven to be generally satisfactory, there are problems inherent to their design. The fact that the flask itself must be rotated necessitates a relatively heavy duty and expensive mechanism for accomplishing this task. To rotate this flask rapidly, for example, at speeds of the order of 500 to 600 revolutions per minute which may be required in order to control foaming and bubbling for certain solvents being processed, further necessitates extensive and costly equipment upgrading.

The conventional rotary evaporator design also requires a reliable, vacuum tight rotary seal at the connection between the flask and the means employed to rotate the flask, with the added expense, complexity and potential problems with vacuum leaks inherent in such rotary joints.

A further problem occurs when continuous operation is needed. To introduce solvents to be processed into a rotating flask requires an ingenious, but complicated device as is evident from U.S. Pat. No. 2,865,445.

Again, the fact that standard designs necessitate the flask to be rotated at ambient room temperature limits heat transfer efficiency within the flask, while presenting a potential safety hazard to laboratory personnel.

Accordingly, it is an object of this invention to provide a rotary evaporator that remains stationary during operation, thereby eliminating the necessity for rotary seals, and providing simple operation for either batch or continuous procedures.

Another object is to provide a large surface area for rapid evaporation while at the same time increasing the convenience of product removal and equipment cleanup.

Another object of this invention is to permit high speed rotation of a thin solvent film when required and to do so in a simple and safe manner.

Another object is to increase control over foaming and bubbling during evaporative procedures.

A further object is to permit operation at higher vacuum than is customarily employed.

Finally, it is an object of this invention to improve heat transfer efficiency during rotary evaporator operation.

SUMMARY OF THE INVENTION

The above and related objects are obtained in a magnetically driven rotary evaporator wherein a thin solvent film is caused to be formed on a cylindrical rotor which rotates within a container in which solvent to be processed has been placed.

I find that the efficiency and convenience of current laboratory scale rotary evaporators can be equalled and exceeded by inducing solvent rotation within a stationary container. In the instant invention a cylindrical rotor, being open at its top, and with a base which has openings, the base of the rotor having at least one magnet affixed to it, is placed within a cylindrical glass container which is open at one end and closed at its other end. Solvent to be evaporated is placed within the container, and the container is capped with a vacuum tight closure. The container is provided with means for connecting it to a source of vacuum. The container is now placed in a substantially horizontal position on a hot plate means, with the base of the container being placed in close proximity to at least one externally located magnet, which in turn is connected to a motor capable of rotating this external magnet. When a vapor transport tube is connected to the container and this tube is connected to a source of vacuum, such as a water aspirator, and the motor is energized, the external magnet will cause the magnet within the rotor to turn in synchrony, and a thin film of solvent forms on the rotor, and the solvent begins to evaporate. Heating the contents of the container, as, for example, by placing the flask in a heated water bath will, of course, greatly accelerate evaporation rates.

A cylindrical shape for the container is preferred for bubble and foam suppression, but alternatively the container may be square or rectangular in shape, and may be fabricated in materials other then glass. The container must have one relatively large opening for the convenient placement and removal of the rotor, and for access to solvent concentrates or residues. The means for connecting the container to a source of vacuum for the removal of non-condensable and condensable vapors from the container may consist of a hollow cylinder connected to an opening in the wall of the container itself, or in an aperture within the elastomeric main closure for the container.

The rotor is preferably substantially the length of the container so as to provide a maximum surface area for the evaporation of the thin solvent film. At least one magnet is affixed to the base of the rotor to insure a firm magnetic coupling. Alternatively a metal bar capable of being magnetically secured by the external magnet on the motor can be affixed to the base of the rotor. For most applications the base of the rotor has openings so as to make use of both its internal and external surfaces for thin film solvent deposition. Alternatively the rotor may have a solid base for those applications wherein it is desirable to have solvent desposition primarily on the external surface of the rotor, with the internal surface of the rotor available for additional bubble and foam control, as will be further discussed.

The invention permits additional control over bubbling and foaming than that which is obtained with standard rotary evaporators. For troublesome bubbling and foaming applications the rotor may be operated at high rotational speeds safely and easily. To this end it is desirable to fabricate the rotor so that its external diameter is just slightly less than the internal diameter of the container, so that oscillations of the rotor which may occur at high rotational speeds, and cause a loss of magnetic coupling to the external magnet, are substantially controlled. Alternatively a ring, the outer diameter of which is just slightly less than the internal diameter of the container, may be placed on the outer surface of the rotor to control excessive oscillations. A preferred method for controlling rotor oscillations at high speeds is to have a circumferential guide within the surface of the container closure which contacts the solvent. With the top of the rotor contacting and being supported by this circumferential guide, safe high speed rotor rotation may be achieved with control of excessive oscillations. This circumferential guide may consist of three or more pegs, or a circumferential groove on the inner surface of the container closure. Additional bubble and foam control may be obtained by having a foam suppression tube in the form of a hollow cylinder, being secured at one end to the inner surface of the container closure, being positioned at a spaced distance inside of the rotor, extending two thirds or more of the length of the rotor, and being in close proximity to the inner rotating surface of the rotor.

The main closure for the container required for convenient rotor insertion or removal may be fabricated out of rigid materials together with elastomeric O rings for vacuum retention, or entirely out of suitable elastomers, or a combination of the two. A preferred combination is a rigid inner member fabricated in a polymeric fluorocarbon as, for example, Teflon, together with an elastomeric outer member such as clear urethane.

At the conclusion of an evaporative procedure the large opening in the container permits easy access for removal of the rotor and the container contents. Fabricating the rotor, the foam suppression tube, and at least the inner portion of the container closure out of polymeric fluorocarbon, or out of materials coated with a polymeric fluorocarbon, permits rapid product recovery and equipment clean-up. In this manner laboratory scale rotary evaporation is performed simply and conveniently, with increased heat transfer efficiency and greater control over bubbling and foaming at various degrees of process vacuum than was heretofore possible.

BRIEF DESCRIPTION OF THE DRAWINGS

FIG. 4 is a partially sectional view of the solvent evaporator illustrating another embodiment of the invention, including the rotor taken along the line 4—4 of FIG. 5.

FIG. 5. is one embodiment of the rotor of the invention, illustrating openings in the base of the rotor taken along the line 5—5 of FIG. 4.

FIG. 6 is one embodiment of the rotor of the invention, illustrating the open top of the rotor taken along the line 6—6 of FIG. 4.

DESCRIPTION OF THE PREFERRED EMBODIMENT

Figure 1:
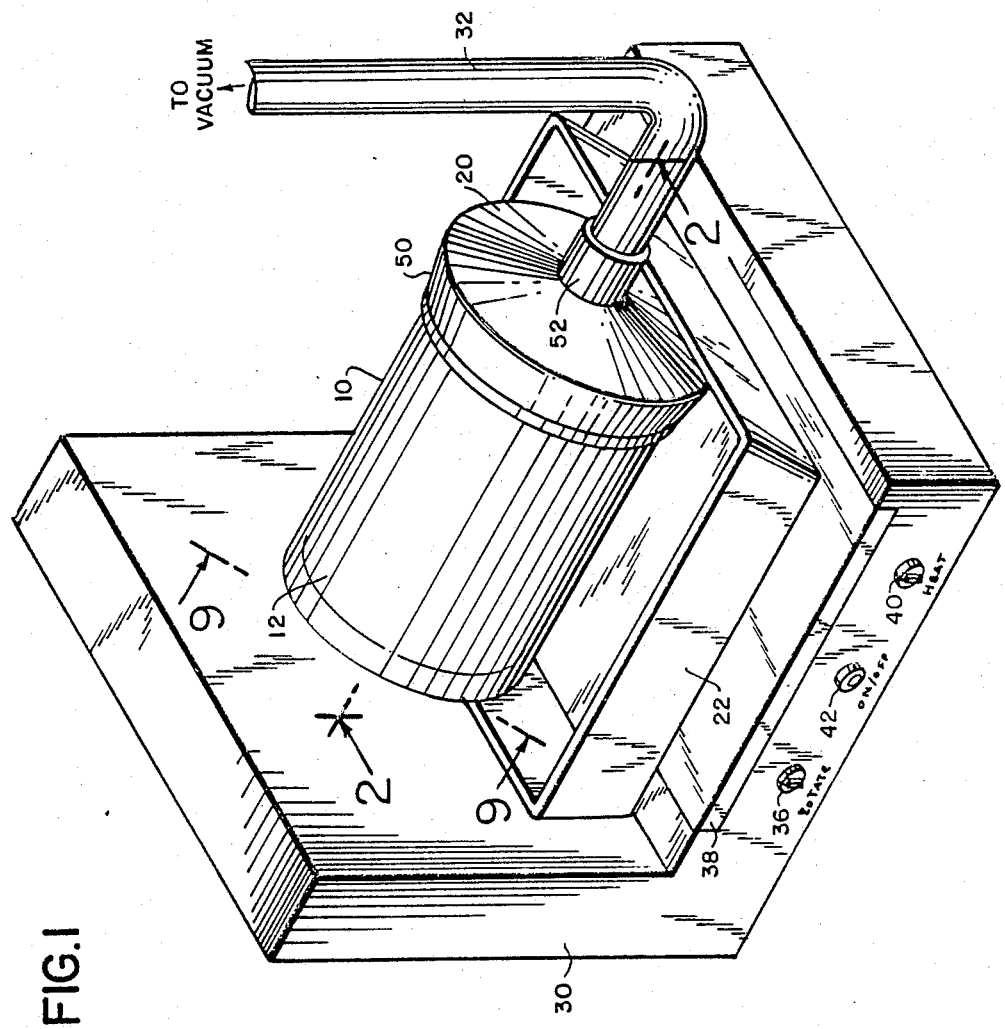
FIG. 1 is a perspective view of one possible embodiment of the invention.
Figure 2:
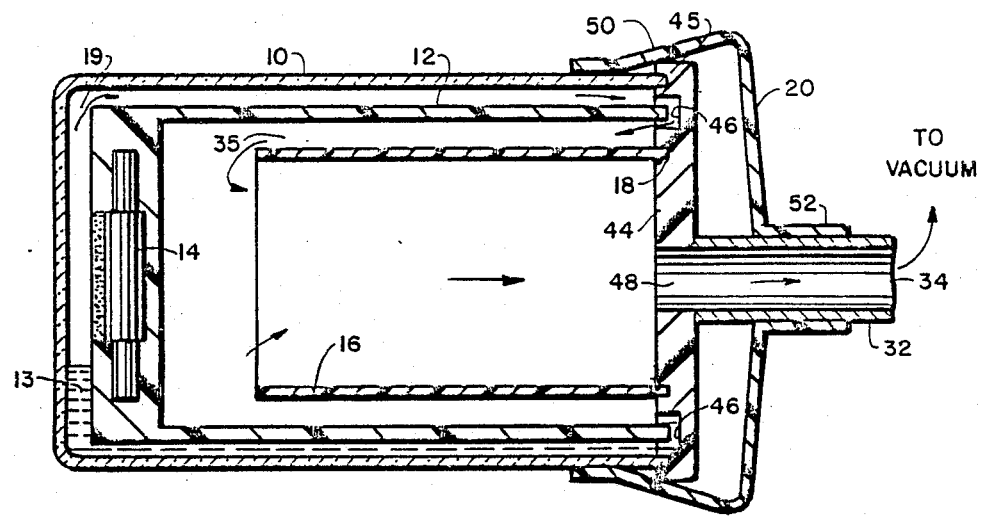
FIG. 2 is a sectional view of the container and container closure portion of the solvent evaporator illustrating a solid base rotor and foam suppression tube, taken along the line 2—2 of FIG. 1.

Referring now to FIG. 1 a rotary evaporator in accordance with the present invention is shown. Container 10, with enclosed rotor 12. together with container closure 20 which is in vacuum tight engagement with the open end of container 10, contained in water bath tray 22, are set in place on hot plate means 38 which forms the top right hand surface of control box 30. One end of the vapor transport tube 32 is in vacuum tight engagement with a source of vacuum (not shown). Conduit 34 (FIG. 2) in vapor transport tube 32 provides the exit pathway for both air and solvent vapors in container 10 via opening 48 (FIG. 2) in container closure liner 44 (FIG. 2). Located on the front panel of control box 30 are on/off switch 42, rotation control knob 36, and heat control knob 40.

Container 10 is preferably fabricated in clear borosilicate glass. Alternative materials of fabrication can include metal, such as stainless steel, plastics, etc. Container 10 may be square or rectangular in shape, but it is preferably substantially cylindrical along its length, being closed at its base, and open at its top. The closed base of container 10 is substantially flat to facilitate permitting a strong magnetic coupling between the magnetic means 14 (FIG. 2) in the base of the rotor (FIG. 2), and the external magnet 24 (FIG. 4).

Container closure 20, together with its neck portion 52 and skirt portion 50, is preferably fabricated in a clear elastomer, such as a polyurethane elastomer. This rubbery material should have a durometer of between 30 and 50 on the Shore A scale. Container closure liner 44 (FIG. 2) lines the internal surface of container closure 20, and provides a rigid closure for container 10. Liner 44 is preferably made from a polymeric fluorocarbon as will be discussed below for the rotor 12 (FIG. 2).

Figure 9:
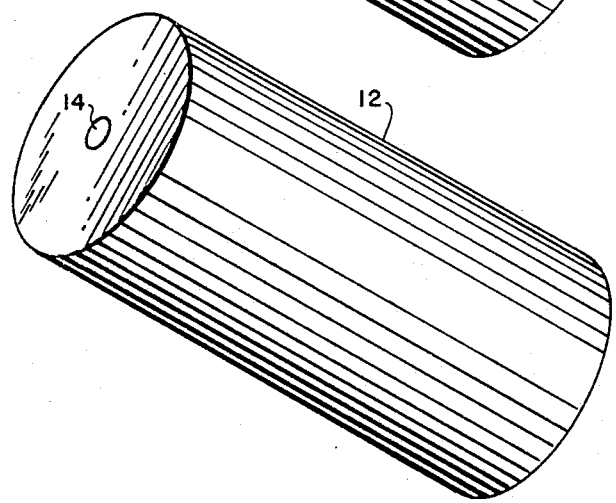
FIG. 9 is one embodiment of the rotor of the invention, illustrating a solid base taken along the line 9—9 of FIG. 1.

FIG. 2 illustrates the arrangement of rotor 12 and foam suppression tube 16 within container 10 and container closure 20. Rotor 12 is substantially cylindrical along its length, and is open at its top and closed at its base (FIG. 9). Rotor 12 may be fabricated from a polymeric fluorocarbon such as polytetrafluoroethylene. However, superior heat transfer is obtained if rotor 12 is fabricated in either thin wall copper or aluminum which is coated with polytetrafluoroethylene. Affixed to the base of rotor 12 is a means for magnetically attracting the rotor base, which is illustrated in FIG. 2 as magnet 14. This magnet may be coated with polytetrafluoroethylene, and then cemented or otherwise affixed to the base of rotor 12. Or magnet 14 may be encased in polytetrafluoroethylene, or encased in a material which in turn is coated with polytetrafluoroethylene. Other suitable polymeric fluorocarbons for fabricating rotor 12, or for coating a base material to be used in the fabrication of rotor 12 include: fluorinated ethlene-propylene copolymer; perfluoroalkoxy resin; ethylene-tetrafluoro ethylene copolymer; polyvinylidene fluoride; polychlorotrifluoroethylene; ethylene-chlorotrifluoroethylene copolymer; polyvinyl fluoride. These polymeric fluorocarbons are described in an article entitled "Fluoroplastics", by C. A. Sperati, Modern Plastics Encyclopedia, 1986-1987 McGraw Hill Publishers, the disclosure of which is hereby incorporated by reference.

Water bath tray 22 forms part of a conventional hot plate and will not be described in detail. Conventional electrical resistance heating elements (not shown) are affixed to the internal surface of hot plate 38, connected by suitable wiring (not shown) to a thermostat (not shown) whose heat settings are controlled by turning heat control knob 40. Water bath tray 22 and hot plate 38 may be fabricated in aluminum.

Control box 30 is preferably fabricated from sheet steel.

External magnet 24 (FIG. 4) forms part of a conventional rotary magnetic drive and will not be described in detail. Magnet 24 is connected to and powered by variable speed motor 28 (FIG. 4). Variable speed motor 28 is rigidly connected to the left side panel of control box 30. Suitable wiring connects the motor to a variable transformer (not shown) within the control box. Rotation control knob 36 provides the control mechanism for the variable transformer, and is wired (not shown) to on/off switch 42 as is heat control knob 40. Magnet 24 is placed in close proximity to the opposite wall of the control box to which the motor is attached, in order to exert a maximum magnetic attraction to rotor magnet 14 when this is in place within container 10, and is set against the outer wall of control box 30.

FIG. 2 also illustrates the foam suppression tube 16, shown in place inside of rotor 12. Foam suppression tube 16 is cylindrical throughout its length, is open at both ends, and extends two thirds of more of the length of rotor 12. It is preferably fabricated in polytetrafluoroethylene or any of the other polymeric fluorocarbons listed above as suitable for rotor 12.

FIG. 2 also shows the vacuum tight closure arrangement for container 10, together with the necessary means for connection to a source of vacuum, and the means for securing the foam suppression tube and for guiding rotor 12.

Container closure liner 44 (FIG. 2) is preferably fabricated in a rigid polymeric fluorocarbon with circumferential groove 45 to secure the edge of the open end of container 10, circumferential guide 46 to serve as a guide for rotor 12, circumferential groove 18 to secure the edge of one end of the foam suppression tube 16, and opening 48 to provide an exit pathway for evacuating air and evaporating solvent vapors into vapor transport tube 32 via conduit 34. Alternatively to circumferential guide 46, foam suppression tube 16 can act as both a foam suppression tube and a circumferential guide for rotor 12.

With container closure liner 44 in place on container 10 and rotor 12 and foam suppression tube 16 engaged in circumferential guide 46 and groove 18 respectively, container closure 20 is positioned over container closure liner 44, with skirt 50 contacting the outer periphery of container 10. Vapor transport tube 32 is now inserted into neck portion 52 of container closure 20. During operation, when vacuum is applied to conduit 34 via vapor transport tube 32, elastomeric skirt 50 collapses about the outer periphery of the container, and elastomeric neck 52 collapses about the vapor transport tube, forming an unusually reliable vacuum tight seal.

To begin a solvent evaporation, the solvent to be processed is poured into the container, the rotor is placed base down in the container, and the container closure liner 44 and container closure 20 are secured to the open end of the container. The container is placed in water bath tray 22 which is on top of hot plate 38. Water (not shown) is added to the water bath tray to provide the heat transfer fluid. The container is manually positioned until it is obvious that external magnet 24 and rotor magnet 14 are firmly engaged magnetically. The vapor transport tube is connected to neck 52 and to a source of vacuum, or to a means for condensing solvent vapors emanating from the container which in turn is connected to a source of vacuum. Vacuum pumps, such as water aspirators and rotary vacuum pumps, are routinely used to create the vacuum required for laboratory scale rotary evaporations. Turning switch 42 to the "on" position energizes the apparatus, and rotation control knob 36 is employed to obtain sufficiently rapid rotation of rotor 12 within container 10 as to cause a thin film of solvent to cover the surface of the rotor. The source of vacuum is applied to conduit 34 in vacuum transport tube 32, skirt 50 collapses about the vapor transport tube causing a vacuum to obtain within the container. Evaporation begins immediately, and evaporation rates may be further expedited by activating heat control knob 40 to supply thermostatically controlled heating to the water in the water bath tray. Evaporating solvent vapors pass through space 19 between the rotor 12 and the inner surface of the container, around circumferential guide 46, between the inner surface of rotor 12 and the outer surface of foam suppression tube 16, then out of the center of the foam suppression tube to opening 48 in container closure liner 44, and then the solvent vapors exit the container via conduit 34 in vapor transport tube 32. Vapors are removed from the system either directly by the source of vacuum or by means for condensing these vapors being used together with the source of vacuum. Rotor rotation may be continued until a sufficient pre-determined degree of solvent concentration has been obtained, or until the material being processed is dry.

When the degree of evaporation is complete, the source of vacuum is turned off, the vapor transport tube is removed from the neck 52, and the container closure, the container closure liner, the foam suppression tube, and the rotor are quickly removed. Product recovery, even of gummy residues, and equipment clean-up is fast and easy since all areas of the cylindrical container and the cylindrical polymeric fluorocarbon coated rotor are conveniently accessible.

The above operational example is recommended for materials having a tendency to excessive bubbling and foaming, especially when a rotary vacuum pump, capable of creating a vacuum which is considerably lower than that which can be obtained with a water aspirator, is employed. If foam, for example, is to gain access to opening 48 and hence escape from the container it must first exit space 19 through the shearing action of the edge of rotor 12 spinning on circumferential guide 46, then be subjected to additional shearing action as it travels between the inner wall of the rotating rotor and the outer wall of the foam suppression tube, before entering the center portion of the foam suppression tube, and finally exiting the container via aperture 48. High rotational speeds of the order of 500 to 600

R.P.M.'s or more, which may be needed for difficult evaporations, are easily and safely obtained.

Figure 3:
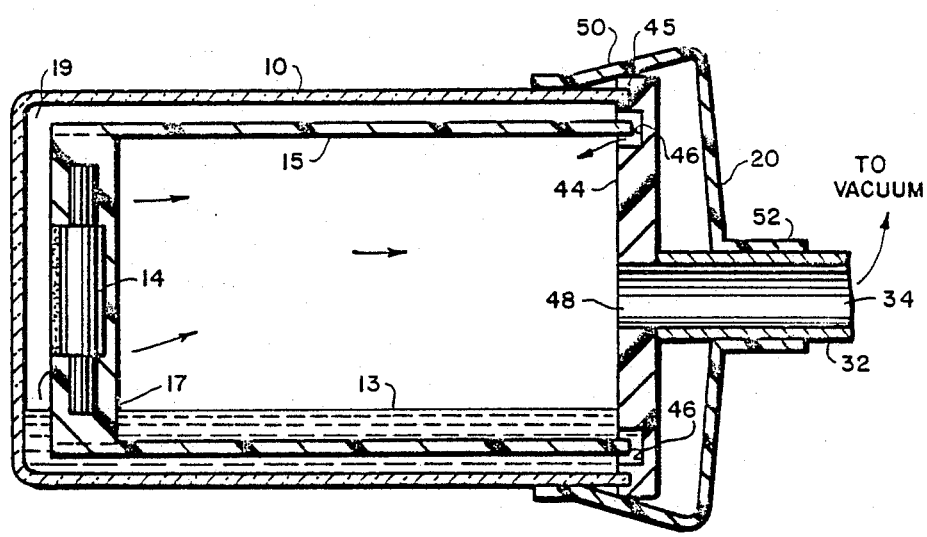
FIG. 3 is a sectional view of one possible embodiment of the container and container closure portion of the invention, illustrating a rotor with openings in the base of the rotor.

FIG. 3 shows a container and rotor arrangement suitable for solvent evaporations which present no special bubbling and foaming problems, as, for example, when a water aspirator provides the source of vacuum, and high speed rotor rotation is not required. For these application foam suppression tube 16 may not be required, and can be removed from the container. To take full advantage of both the inner and outer surfaces of the rotor for thin film solvent deposition, rotor 15 (FIGS. 5 & 6) is employed in place of rotor 12. The base of rotor 15 has openings 23 and 25, and its top has wide opening 25' to permit free flow of the solvent 13 to all areas within container 10. Magnet 14 is fully encased in enclosure 17 of the base of rotor 15. Liquid to be processed is placed both within the rotor and the container up to a maximum permissible loading (approximately 40% of the volumetric capacity of the container). Under these conditions the full usable volumetric content of the container may be employed, and also the inner as well as outer surfaces of the rotor 15 serve as an area for thin film solvent deposition, essentially providing double the solvent area for evaporation. Obviously, concentrically spaced rotating "shells" could be added to increase evaporative surface area if this was considered desirable.

FIG. 4 illustrates an arrangement of the invention in which the means for connecting the container to a source of vacuum consists of a hollow tube which in turn connects to an opening in the wall of the container 11 itself. To operate, solvent 13 is placed within container 11, rotor 15 is placed within the container, and the larger opening in the container (the purpose of which is to provide for convenient insertion and removal of the rotor) is closed with container closure liner 44, and elastomeric container closure 21. For those applications involving excessive bubbling and foaming foam suppression tube 16 may be employed by connecting it to container closure liner 44 prior to securing the liner to container 11.

Container 11 is placed within water bath tray 22, which in turn is placed on hot plate 38, making certain that magnet 14 in base enclosure 17 is securely engaged magnetically by external magnet 24. Hollow tube 56 is now connected to a source of vacuum, as, for example, by means of rubber vacuum tubing. Turning on switch 42 energizes the apparatus, permitting turning rotation control knob 40 to cause external magnet 24 to rotate, which in turn causes rotor 15 to rotate in synchrony. Water may be added as a heat transfer fluid to water bath tray 22, and at this time heat control knob 40 can be activated to supply thermostatically controlled heating to solvent 13. The source of vacuum, as, for example, a water aspirator, is turned on causing air and solvent vapor to be rapidly removed from the container via conduit 58 in tube 56, while at the same time elastomeric container closure 21 collapses about container closure liner 44, and the skirt portion 62 of elastomeric container closure 21 collapses about the outer periphery of the large opening of the container, forming a vacuum seal. The rotor rotating within the container causes a thin film of solvent to be deposited on both the internal and external surfaces of the rotor. Under these conditions of vacuum, controlled heating, and thin solvent film formation, evaporation proceeds efficiently. Since in this arrangement the large opening in container 11 is entirely closed with elastomeric container closure 21, it is permissible to process volumes of solvent in excess of 50% of the volumetric capacity of the container. Solvent vapors being generated within the internal surfaces of rotor 15 exit container 11 via openings 23 and 25 at the base of the rotor, and opening 25' at the top of the rotor. Vapors exiting via the top of the rotor further pass around circumferential guide 46. Once between the outer surface of the rotor and the inner surface of the container solvent vapors migrate to conduit 58 in hollow tube 56. Solvent vapors are then either directly pumped out of the system or are subjected to a means for condensing solvent vapors operating in series with a source of vacuum.

The arrangement illustrated by FIG. 4 provides unique bubble and foam control even with a rotor with openings in the base. With rotor 15 operating within circumferential guide 46 high rotational rotor speeds may be safely and easily employed. Foaming is largely controlled since most of the foam is generated on the inside portion of the rotor. To gain access to conduit 58 foam must first pass through the shearing action of magnet 14 enclosure 17 and the edges of the base of the rotor, or, at the top of the rotor foam is subjected to the shearing action of the rapidly rotating top edge of the rotor spinning within circumferential guide 46. Additional foam control is obtained as foam attempts to traverse the distance between the base and top of the rotor and conduit 58. Further foam control is obtained with foam suppression tube 16 in place which forces foam migrating to the top of the rotor and the circumferential guide through the additional shearing action obtained by the rapidly rotating inner surface of the rotor and the outer surface of the stationary foam suppression tube.

Figure 7:
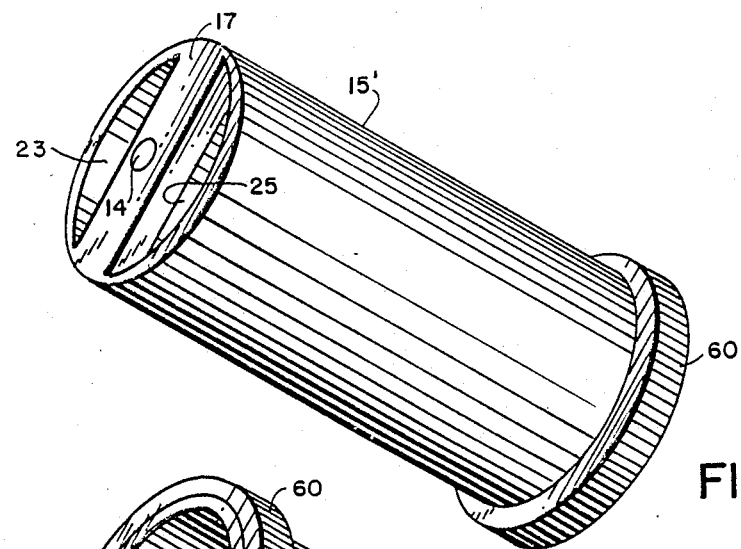
FIG. 7 is one embodiment of the rotor of the invention, showing a base with openings together with a circumferential guide.
Figure 8:
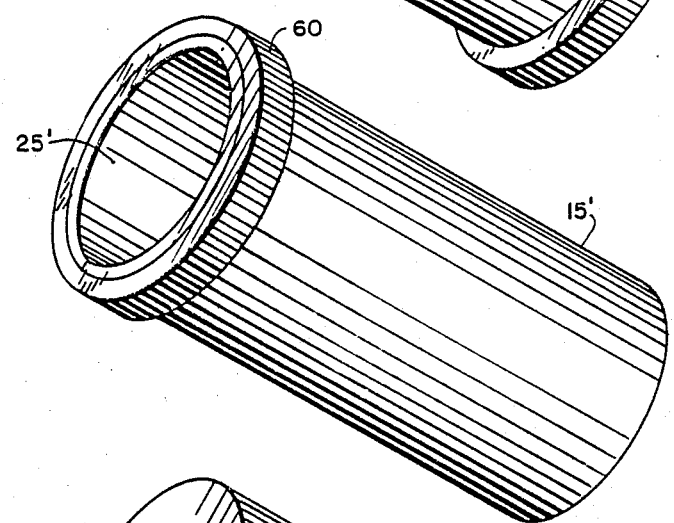
FIG. 8 is one embodiment of the rotor of the invention, showing the open top together with a circumferential guide.

FIGS. 7 & 8 illustrate rotor 15' with an attached circumferential guide 60 as has been discussed. With a circumferential guide affixed to the rotor itself, the rotor may be operated at high rotational speeds without danger of excessive oscillations with subsequent loss of magnetic coupling, and, of course, without the necessity for a circumferential guide being built-into the inner surface of the container closure liner 44.

FIG. 9 illustrates the solid base of rotor 12 as was discussed for the proper operation described above for FIGS. 1 & 2.

Since the container always remains stationary during evaporative procedures, a variety of relatively simple methods may be employed to add solvents during operation so that evaporation can proceed on a continuous basis.

While the present invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. An apparatus for evaporating a solvent, which comprises:
   (A) A motor with an attached magnet;
   (B) A hot plate means;
   (C) A container for said solvent;
   (D) Said container having a base, and said container having an opening for the placement of a rotor within said container;
   (E) A closure for said opening in said container;

(F) Means for connecting said container to a source of vacuum;

(G) Said rotor being cylindrical in shape, having a base and an open top, said base in said rotor having an opening, said rotor being removably placed within said container;

(H) Means for magnetically attracting said base of said rotor, being affixed to said base of said rotor; and (I) said container and said rotor being positioned in a substantially horizontal position on the top surface of said hot plate means, with the base of said container being immmediately adjacent said magnet, such that the magnetic field of said magnet securely engages the means for magnetically attracting said base of said rotor so that when said motor is energized said magnet is caused to rotate which simultaneously causes said rotor to rotate in synchrony with said magnet, and a thin film of said solvent is caused to be deposited onto the inner and outer surfaces of said rotor.

2. An apparatus according to claim 1 wherein said means for magnetically attracting said base of said rotor is a second magnet.

3. An apparatus according to claim 1 wherein said base of said container is substantially flat.

4. An apparatus according to claim 3 wherein said container is a cylindrically shaped glass flask.

5. An apparatus according to claim 1 wherein said hot plate means further includes means for containing a heat transfer fluid.

6. An apparatus according to claim 1 wherein said rotor is fabricated in a polymeric fluorocarbon.

7. An apparatus according to claim 1 wherein said rotor is coated with a polymeric fluorocarbon.

8. An apparatus according to claim 7 wherein said coating is applied to said rotor fabricated in metal selected from the goup consisting of aluminum and copper.

9. An apparatus according to claim 1 wherein said means for magnetically attracting said base of said rotor is encased in a polymeric fluorocarbon.

10. An apparatus according to claim 1 further comprising means for controlling oscillation of said rotor during said rotation.

11. An apparatus according to claim 10 wherein said means for controlling said oscillation is a circumferential guide affixed to the surface of said rotor.

12. An apparatus according to claim 10 wherein said means for controlling said oscillation is a circumferential guide contained within the surface of said container closure which is exposed to the contents of said container.

13. An apparatus according to claim 12 wherein said circumferential guide is a hollow cylindrical tube, one end of which connects to said surface of said closure, and is positioned within said rotor, and extends at last two thirds of the length of said rotor.

14. An apparatus according to claim 12 further comprising a foam suppression tube in addition to said circumferential guide, said tube being a hollow cylindrical tube, one end of which connects to said surface of said container closure which is exposed to the contents of said container, and is positioned within said rotor, and extends at least two thirds of the length of said rotor.

15. An apparatus according to claim 1 wherein said closure for said container is fabricated in a polymeric fluorocarbon.

16. An apparatus according to claim 1 wherein said closure for said container is coated with a polymeric fluorocarbon.

17. An apparatus according to claim 13 wherein said circumferential guide is fabricated in a polymeric fluorocarbon.

18. An apparatus according to claim 14 wherein said foam suppression tube is fabricated in a polymeric fluorocarbon.

19. An apparatus for evaporating a solvent, which comprises:
(A) A motor with an attached magnet;
(B) A hot plate means;
(C) A cylindrical glass flask, having a base and a top, said base of said flask being closed, and said top of said flask being open;
(D) Said base of said flask being substantially flat;
(E) A closure for said flask;
(F) Means for connecting said flask to a source of vacuum;
(G) Means for controlling oscillation of a rotor during rotation;
(H) Said rotor being cylindrical in shape, having a solid base and an open top, said rotor being removably placed within said flask;
(I) Means for magnetically attracting said base of said rotor being affixed to said base of said rotor; and
(J) Said flask being positioned in a horizontal position on the top surface of said hot plate means, with the base of said flask immediately adjacent said magnet, such that the magnetic field of said magnet securely engages said means for magnetically attracting said base of said rotor so that when said motor is energized said magnet is caused to rotate which simultaneously causes said rotor to rotate in synchrony with said magnet, and a thin film of said solvent is caused to be deposited substantially onto the outer surface of said rotor.

20. An apparatus according to claim 19 wherein at least the inner surface of said closure for said flask, said means for controlling oscillation of said rotor, said rotor, and said means affixed to said base of said rotor for magnetically attracting said base are fabricated in a polymeric fluorocarbon.

21. An apparatus according to claim 19 wherein at least the inner surface of said closure for said flask, said means for controlling oscillation of said rotor, said rotor, and said means affixed to said base of said rotor for magnetically attracting said base are coated with a polymeric fluorocarbon.

22. An apparatus according to claim 19 further comprising a foam suppression tube, said tube being a hollow cylindrical tube, connected to the inner surface of said closure for said flask, positioned within said rotor, and extending at least two thirds of the length of said rotor.

23. An apparatus according to claim 22 wherein said foam suppression tube is fabricated in polymeric fluorocarbon.

* * * * *